United States Patent Office 2,965,477
Patented Dec. 20, 1960

2,965,477
TREATMENT OF MOLTEN METALS

Voya Kondic and Albert Ralph Watson, Birmingham, England, assignors to Foundry Services International Limited, Birmingham, England, a British company No Drawing. Filed Sept. 12, 1957, Ser. No. 683,441

Claims priority, application Great Britain Sept. 24, 1956

5 Claims. (Cl. 75—93)

This invention relates to the treatment of molten metals in foundry practice.

It is well known practice, in the treatment of molten metals in the foundry, to introduce into the metal a conditioning material in the form of a tablet of such material. Often such tablets are of a character such that under the conditions obtaining in the molten metal they generate a gas which effects the required conditioning of the metal. The present invention has for an object the provision of improved forms of such gas-generating conditioning materials and the provision of improved processes of conditioning molten metal with the aid of such gas-generating conditioning materials. Such materials may be of varied character as indicated below.

It is well known that in the processing of molten metals there is a tendency for the metal to occlude and/or dissolve undesirable gases; thus molten aluminium and its alloys may occlude or dissolve hydrogen. On solidification of such molten metals the occluded or dissolved gas tends to cause small cavities in the solid metal, thus undesirably affecting its physical characteristics. It is, therefore, important to subject molten metal to a so-called degassing treatment and a common method of effecting such treatment is to add to the metal a substance which will generate a gas in the molten metal so that the generated gas in its passage through the metal will entrain the occluded or dissolved gases. Typical of use for this purpose is the substance hexachlorethane which, at the temperature of the molten metal is converted to gas which exerts this entraining action.

Gas-generating materials may also be employed to remove unwanted metals from molten metal mixtures. Thus magnesium may be removed from aluminium by means of chlorine generated by the introduction of hexachlorethane. Similarly aluminium can be removed from copper base alloys such as brass or bronze by means of oxygen gas which is introduced in the form of a tablet of mixed oxidising agents.

In certain cases it is desirable to introduce gas into molten metals, an example being the introduction of gas into metal which is to be used for diecastings for the purpose of counteracting contraction and hot tears in such castings. Hydrogen, used for such a purpose is usually introduced in the form of water vapour by means of tablets of harmless chemical salts containing large amounts of water of crystallization, e.g. borax.

It has been discovered that the effectiveness of such conditioning materials may be substantially improved by providing that the gas is generated not as a relatively small number of large bubbles but as a large number of small bubbles and it is an object of this invention to provide means whereby this object may be achieved.

According to the present invention a product for addition to molten metal to generate gas therein comprises a solid substance (hereinafter referred to as a conditioning material) which at the temperature of the molten metal generates or is converted into a gas adapted to condition the metal, and which is so located or arranged in relation to a second material that the gas generated from said substance issues into the molten metal in the form of a mass of small bubbles. Small bubbles travel more slowly than large bubbles upwards through the molten metal and, accordingly, are more effective in conditioning both because of the longer time they remain in contact with the molten metal and because they provide an overall greater area of contact with the molten metal.

According to one embodiment of the invention there is provided a conditioning composition which comprises a solid conditioning material in admixture with a filler, the conditioning material being intimately distributed in the filler medum. Conveniently the composition may be in the form of a tablet. Due to the presence of the filler particles the gas is generated as a mass of fine bubbles.

Within this form of the invention there are many possible variants. If the filler employed is such that it brings the specific gravity of the composition to a value greater than that of the molten metal to which it is to be added, e.g. 0.2 or 0.3 greater in specific gravity, the resulting composition is self-sinking in the molten metal. Suitable fillers for this purpose are, for example, zirconium silicate and barium sulphate. Where, however, such a high net specific gravity is not achieved, so that the composition will not sink it must then be plunged below the surface of the molten metal in order to become effective. When a self-sinking composition is not required a lighter material such as grog (crushed fire brick) is suitable as filler and is very cheap. However, other fillers may be used, e.g. sand, silimanite, magnesite and sodium chloride. The quantity of the filler may vary widely and may constitute a very substantial proportion of the whole composition, e.g. up to 90% by weight of the composition, for instance 30–80% thereof. Thus a composition containing 40–60% grog and the remainder hexachlorethane is a very efficient but nevertheless relatively much cheaper degassing material as compared with hexachlorethane used alone.

Generally speaking, it is desirable to employ a filler which is a poor conductor of heat since in this way when a tablet of the composition is introduced into molten metal there is a longer delay period before the tablet disintegrates due to delay in the conduction of heat to the centre of the tablet. Refractory or heat-insulating fillers are, therefore, often preferred.

However, there may be used as filler, instead of refractory materials, other materials which may themselves be destroyed or may merge into the molten metal so that there is no residual matter from the composition. Indeed, it is within the scope of this invention to employ as the filler material a substance which acts to modify or condition the metal in some desired manner, e.g. by providing an additional alloying constituent. Thus, when alloying aluminium it is common to add the alloying addition in the form of an aluminium alloy itself, e.g. when alloying with manganese or copper the alloying additions are added as aluminium/maganese or aluminium/copper. Such alloying additions may be employed as fillers in the compositions of the present invention, e.g. hexachlorethane may be incorporated in such fillers so that at the same time as the alloying is going on, degassing is carried out. When employing ferro manganese as the filler it is desirable that barytes should be present to prevent inclusions and contamination by alloying.

The compositions of the invention may also contain other non-gasifying conditioning agents, e.g. grain refining materials such as potassium borofluoride.

There is sometimes a tendency with compositions containing refractories to disintegrate on the evolution of the gas, and the refractory may form a slurry on the floor of the melting chamber, it may be suspended in the molten metal or it may rise with the slag to the surface of the molten metal, depending on its specific gravity. Whilst this may not have any effect on the metal, it does occasionally form inclusions in the metal as cast. This disadvantage may be overcome by mixing with the degassing or other conditioning agent and refractory or other chemical, two or more salts or compounds of different melting point, one of which has a melting point below that of the molten metal and will react with the other compound at the temperature of the molten metal to form a compound having a higher melting point than that of the molten metal. By using such salts or compounds (one of which may itself act as the filler) the tablet becomes self-sintering and forms itself into a solid body on the bottom of the bath of molten metal, thus lessening the tendency to form inclusions in the cast metal. Such tablets are, for example, made of sodium or potassium borufluoride or a mixture thereof as the lower melting point component with sodium fluoride as the higher melting component. Borax may also be used as the lower melting point component and calcium fluoride or other powder salts or refractories may be used as the higher melting component.

According to a still further feature of this invention the composition containing the conditioning agent and the refractory or other chemical, also includes a salt having a low melting point, which decomposes at the temperature of the molten metal giving off gas and leaving a residue which has a higher melting point than that of the molten metal. An example of such a salt is sodium-silicofluoride which gives off silicon-tetrafluoride gas and leaves as a residue sodium-fluoride, the latter being a high melting point compound and solid at the temperature of molten aluminum or magnesium or alloys thereof.

In accordance with yet a further feature of the invention there is provided a solid body containing a degassing material and a refractory or other chemical as aforesaid, wherein the degassing material gives off chlorine or other degassing gas, whereby, as a result of this evolution of gas, the solid body becomes less dense than the metal in which it is immersed and thus floats to the surface. Such a solid body may consist of a hexachlorethane/refractory mixture, the amounts of refractory and hexachlorethane and the degree of compression being so adjusted initially as to give the body a residual specific gravity, after decomposition of the degassing compound, such that it will rise to the surface of the molten metal in which it was originally placed.

Where the composition is not of higher specific gravity than the molten metal to which it is to be added it is necessary to plunge it below the surface of the metal. A particularly convenient way of achieving this, which forms a feature of the present invention, is to provide the composition in the shape of a flat cylinder having a central aperture. It may then be threaded, by the said aperture, on to a plunger rod, stop means being provided to prevent it riding up the plunger rod when it is immersed in the molten metal. If desired, the plunger rod may terminate in a cylindrical open coil, a block of the composition being located within the coil.

The foregoing materials and methods lead to important advantages. Thus by diluting the conditioning agent while achieving a more effective action therefrom, a considerable economic gain is secured. At the same time the amount of fume produced is reduced and so is the amount of dross, both of which are important advantages of the invention.

The present invention, accordingly, includes compositions as set forth above, and the processes of conditioning molten metals by the introduction of such compositions therein. The materials and methods of conditioning herein described may be applied to the conditioning, e.g. degassing, of various molten metals, e.g. aluminum, magnesium, copper and alloys of any of these.

Hexachlorethane is the degasser of choice for low melting alloys but other materials, e.g. organic bromine and organic iodine compounds such as tetrabromoethylene and polytetrafluorethylene, may also be employed, and generally any solid fully halogenated hydrocarbon is suitable. Any of the halogenated hydrocarbon degassing compositions may contain an oxidising agent to react with carbon formed during the decomposition of such halogenated hydrocarbons. Suitable oxidising agents are chlorates, perchlorates and nitrates of the alkali and alkaline earth metals.

Materials other than degassers may, however, be employed as the conditioning agents, e.g. agents generating oxygen, water vapour or hydrogen.

The following examples will serve to illustrate the invention (proportions given are by weight):

Example I

A degassing composition is formulated as follows and tabletted:

|  | Range, percent | Preferred Range, percent |
| --- | --- | --- |
| Hexachlorethane | 70-20 | 50-25 |
| Potassium nitrate | 0-5 | 0-5 |
| Sodium chloride | 30-80 | 50-75 |
| A specific composition of value within this range is: |  |  |
| Hexachlorethane | 33 |  |
| Potassium nitrate | 2 |  |
| Sodium chloride | 65 |  |

The potassium nitrate referred to above assists in making a stronger tablet but is not absolutely necessary. Other materials may be substituted therefor, e.g. sodium nitrate or a borofluoride or silicon fluoride. Sodium chloride is shown as the preferred filler since not only is it substantially inert to molten metal but it is very cheap and very readily available and may serve as a fluxing agent if the tablet is disintegrated.

Any of the foregoing compositions may contain sintering salts and/or oxidising agents as referred to above, and optionally other fluxing agents, e.g. fluorides.

Example II

A degassing composition of relatively high specific gravity is formulated as follows and tabletted:

|  | Percent |
| --- | --- |
| Hexachlorethane | 50-10 |
| Filler | 50-90 |
| Sintering salts | 0-15 | a preferred composition being:

|  | Percent |
| --- | --- |
| Hexachlorethane | 15-30 |
| Filler | 85-70 |
| Sintering salts | 0-15 | the filler being zircon sand, a heavy metal oxide, copper or ferromanganese.

Where a metal such as copper or ferromanganese is employed as the filler it may be desirable, in order to prevent alloying or the danger of forming inclusions in the molten metal, to include as part of the filler content a refractory such as barium sulphate or zirconium silicate.

Thus a composition of particular value is formulated as follows:

|  | Percent |
| --- | --- |
| Hexachlorethane | 25 |
| Ferromanganese | 45 |
| Barytes | 27 |
| Sintering salts | 3 | the sintering salts being a mixture of sodium or potassium borofluoride and sodium fluoride.

What we claim is:

1. A method of scavenging dissolved gases from molten aluminum and aluminum alloy metal which comprises adding to the molten metal a shaped compacted mass of an intimate admixture of hexachlorethane in an amount between about 10 and about 70% by weight, a particulate filler material which is a solid at the temperature of the molten metal in an amount between about 30 and about 90% by weight, and at least one salt in a sufficient amount, between about 2% and about 15% by weight, to sinter with the filler material at the temperature of the molten metal and form a strengthened solid body having a melting point higher than that of the molten metal.

2. A method of scavenging dissolved gases from molten aluminum and aluminum alloy metal which comprises adding to the molten metal a shaped compacted mass of an intimate admixture of hexachlorethane in an amount between about 10 and about 70% by weight, a particulate filler material which is a solid at the temperature of the molten metal in an amount between about 30 and about 90% by weight and at least one salt selected from the group consisting of sodium and potassium nitrates, borofluorides and silicofluorides in a sufficient amount, between about 2% and about 15% by weight, to sinter with the filter material at the temperature of the molten metal and form a strengthened solid body having a melting point higher than that of the molten metal.

3. A method of scavenging dissolved gases from molten aluminum and aluminum aloy metal which comprises adding to the molten metal a shaped compacted mass of an intimate admixture of hexachlorethane in an amount between about 10 and about 70% by weight, a particulate filler material which is a solid at the temperature of the molten metal selected from the group consisting of sodium chloride, firebrick, sand, silimanite and magnesite in an amount between about 30 and about 90% by weight, and at least one salt selected from the group consisting of sodium and potassium nitrates, borofluorides and silicofluorides in a sufficient amount, between about 2% and 15% by weight, to sinter with the filler material at the temperature of the molten metal and form a strengthened solid body having a melting point higher than that of the molten metal.

4. A method of scavenging dissolved gases from molten aluminum and aluminum alloy metal which comprises adding to the molten metal a shaped compacted mass of an intimate admixture of hexachlorethane in an amount between about 20 and about 70% by weight, sodium chloride in an amount between about 30 and about 80% by weight and at least one salt in a sufficient amount between about 2% and about 5% by weight, to sinter with the filler material at the temperature of the molten metal and form a strengthened solid body having a melting point higher than that of the molten metal.

5. A method of scavenging dissolved gases from molten aluminum and aluminum alloy metal which comprises adding to the molten metal a shaped compacted mass of an intimate admixture of hexachlorethane in an amount between about 25 and about 50% by weight, sodium chloride in an amount between about 50 and about 75% by weight and potassium nitrate in a sufficient amount of about 2% by weight to sinter with the sodium chloride at the temperature of the molten metal and form a strengthened solid body having a melting point higher than that of the molten metal.

References Cited in the file of this patent

UNITED STATES PATENTS

| | | |
|---|---|---|
| 1,092,935 | Mellen | Apr. 14, 1914 |
| 1,478,062 | Scheuch | Dec. 18, 1923 |
| 1,596,888 | Pacz | Aug. 24, 1926 |
| 1,836,196 | Snelling | Dec. 15, 1931 |
| 1,920,465 | Harris | Aug. 1, 1933 |
| 1,945,260 | Davies | Jan. 30, 1934 |
| 1,975,084 | Davies | Oct. 2, 1934 |
| 2,306,976 | Pedersen | Dec. 29, 1942 |
| 2,459,203 | Vahrenkamp | Jan. 18, 1949 |
| 2,494,238 | Griggs et al. | Jan. 10, 1950 |
| 2,510,932 | Poland | June 6, 1950 |
| 2,550,735 | Tour | May 1, 1951 |
| 2,657,458 | Pessel | Nov. 3, 1953 |

FOREIGN PATENTS

| | | |
|---|---|---|
| 593,822 | Great Britain | Oct. 27, 1947 |

OTHER REFERENCES

Non-Ferrous Foundry Metallurgy, A. J. Murphy, published by Pergamon Press Ltd. London, 1954, pages 96–100.